US012800293B2

(12) United States Patent
Cao et al.

(10) Patent No.: US 12,800,293 B2
(45) Date of Patent: Nov. 17, 2026

(54) NON-CONTACT WORKPIECE DIMENSION MEASURING DEVICE AND METHOD

(71) Applicant: FITOW (TIANJIN) DETECTION TECHNOLOGY CO., LTD., Tianjin (CN)

(72) Inventors: Bin Cao, Tianjin (CN); Liming Chen, Tianjin (CN); Jianghong Hu, Tianjin (CN); Shuaipeng Yuan, Tianjin (CN); Nan Zhang, Tianjin (CN); Liqi Wang, Tianjin (CN); Kai Tian, Tianjin (CN); Lu Jiao, Tianjin (CN)

(73) Assignee: FITOW (TIANJIN) DETECTION TECHNOLOGY CO., LTD., Tianjin (CN)

( * ) Notice: Subject to any disclaimer, the term of this patent is extended or adjusted under 35 U.S.C. 154(b) by 238 days.

(21) Appl. No.: 18/857,764

(22) PCT Filed: Dec. 26, 2023

(86) PCT No.: PCT/CN2023/142099
§ 371 (c)(1),
(2) Date: Oct. 17, 2024

(87) PCT Pub. No.: WO2024/217052
PCT Pub. Date: Oct. 24, 2024

(65) Prior Publication Data

US 2026/0185823 A1 Jul. 2, 2026

(30) Foreign Application Priority Data

Apr. 18, 2023 (CN) ......................... 202310409955.1

(51) Int. Cl.
*G01B 11/16* (2006.01)
*G01B 11/00* (2006.01)

(52) U.S. Cl.
CPC ............ *G01B 11/16* (2013.01); *G01B 11/002* (2013.01)

(58) Field of Classification Search
CPC ...................................................... G01B 11/16
See application file for complete search history.

(56) References Cited

U.S. PATENT DOCUMENTS

2016/0044301 A1* 2/2016 Jovanovich .......... H04N 13/282 348/50
2017/0168160 A1* 6/2017 Metzler .................. G01S 17/86
(Continued)

FOREIGN PATENT DOCUMENTS

CN 102914264 A 2/2013
CN 105091744 A 11/2015
(Continued)

OTHER PUBLICATIONS

Lei, Yin, "Research on 3D Surface Measurement and Benchmark Association Based on Dynamic Stereo Vision" (Jan. 15, 2022).
(Continued)

*Primary Examiner* — Rufus L Phillips
(74) *Attorney, Agent, or Firm* — Scully, Scott, Murphy & Presser, P.C.

(57) ABSTRACT

The present disclosure provides a non-contact workpiece dimension measuring device and method, and belongs to the technical field of workpiece dimension measurement. The measuring device includes: a frame, on which a workpiece having a measurement pose is arranged; a first detection assembly, arranged on the frame and aligned with a first feature point of the workpiece, so as to obtain a measurement pose information of the workpiece in a non-contact manner; a second detection assembly, including a plurality of detection sensors arranged on the frame in a distributed manner, one detection sensor being aligned with one measurement point, and the detection sensor being configured to (Continued)

detect a distance therefrom to the measurement point on the workpiece; and a calculation module, configured to calculate a pose offset variation of the detection sensor at the measurement point according to a datum pose information and the measurement pose information, so that the calculation module can calculate calculated surface difference data of the measurement point according to the pose offset variation, the detection distance of the detection sensor, and a datum reading of the measurement point. The measuring device of the present disclosure can measure the external dimension of the workpiece in a non-contact manner.

13 Claims, 7 Drawing Sheets

(56) References Cited

U.S. PATENT DOCUMENTS

| | | | | |
|---|---|---|---|---|
| 2020/0096328 | A1* | 3/2020 | Raab | G01B 11/2522 |
| 2020/0320740 | A1* | 10/2020 | McGarry | G06T 7/75 |

FOREIGN PATENT DOCUMENTS

| | | | | | |
|---|---|---|---|---|---|
| CN | 110095071 | A | | 8/2019 | |
| CN | 110211174 | A | | 9/2019 | |
| CN | 110470242 | A | | 11/2019 | |
| CN | 110645910 | A | | 1/2020 | |
| CN | 110672029 | A | | 1/2020 | |
| CN | 111060025 | A | | 4/2020 | |
| CN | 111750821 | A | * | 10/2020 | G01B 11/002 |
| CN | 112525131 | A | | 3/2021 | |
| CN | 113618367 | A | * | 11/2021 | B25B 11/02 |
| CN | 113847878 | A | | 12/2021 | |
| CN | 215003464 | U | | 12/2021 | |
| CN | 114577165 | A | | 6/2022 | |
| CN | 115112018 | A | | 9/2022 | |
| CN | 115371673 | A | * | 11/2022 | G01C 21/20 |
| CN | 115597534 | A | | 1/2023 | |
| CN | 116147521 | A | | 5/2023 | |
| JP | 2009128075 | A | | 6/2009 | |
| JP | 2013178156 | A | | 9/2013 | |
| JP | 6908206 | B1 | | 7/2021 | |

OTHER PUBLICATIONS

Chinese First Office Action dated May 29, 2023 issued in CN 2023104099551.

Chinese Second Office Action dated Jun. 15, 2023 issued in CN 2023104099551.

International Search Report dated Apr. 13, 2024 issued in PCT/CN2023/142099.

* cited by examiner

NON-CONTACT WORKPIECE DIMENSION MEASURING DEVICE AND METHOD

CROSS-REFERENCE TO RELATED APPLICATION

The present disclosure claims priority to Chinese Patent Application No. 202310409955.1, filed to the China National Intellectual Property Administration on Apr. 18, 2023 and entitled "Non-Contact Workpiece Dimension Measuring Device and Method", the disclosure of which is hereby incorporated by reference in its entirety.

TECHNICAL FIELD

The present disclosure relates to a technical field of workpiece dimension measurement, and in particular, to a non-contact workpiece dimension measuring device and method.

BACKGROUND

A die casting, as a part cast by using a mold, may be affected by various factors in the casting process, which may cause problems in the structure. For example, an outward protrusion or inward recess may appear on the die casting, resulting in an uneven appearance of the die casting, that is, a surface shape change occurs. Therefore, after casting of the die casting is completed, a detailed appearance measurement needs to be performed to determine whether the external dimension of the die casting is qualified, thereby avoiding the problem of surface shape change of the appearance of the die casting.

At present, surface difference data at each easily deformable measurement point on the die casting is usually measured by using a three-dimensional coordinate measuring instrument and a probe, and if the surface difference data of all the measurement points are all within a preset range, it indicates that the external dimension of the die casting is qualified. The surface difference data specifically refers to a value generated by dividing a modeling surface on the die casting due to the design or manufacturing requirement and offsetting a part thereof in a specific direction.

However, due to the need for contact with the die casting for measurement in the actual measurement process, detection errors of the three-dimensional coordinate measuring instrument and the probe on the die casting and human measurement differences of the measurement personnel are prone to occurring, resulting in poor measurement accuracy. In addition, due to the need for contact with the die casting, the problem of deformation of the die casting is easily caused, resulting in damage to the die casting.

In view of the above problems, a non-contact workpiece dimension measuring device and method are urgently needed to solve the above problems.

SUMMARY

The present disclosure provides a non-contact workpiece dimension measuring device, which can detect and calculate calculated surface difference data of each measurement point on a workpiece in a case of zero contact with the workpiece, has better measurement accuracy, and does not damage the workpiece.

In some embodiments, the present disclosure provides a non-contact workpiece dimension measuring device for detecting and calculating calculated surface difference data of a workpiece, which may include: a frame, on which the workpiece having a measurement pose is arranged, wherein a plurality of first feature points and a plurality of measurement points are arranged on the workpiece;

- a first detection assembly, arranged on the frame and aligned with the first feature point, and the first detection assembly can obtain a measurement pose information of the workpiece in the measurement pose in a non-contact manner;
- a second detection assembly, including a plurality of detection sensors, Wherein the plurality of detection sensors are arranged on the frame in a distributed manner, one of the plurality of detection sensors is aligned with one of the plurality of measurement points, and the detection sensor is configured to detect a distance from the detection sensor to the measurement point on the workpiece;
- a calculation module is configured to calculate a pose offset variation of the detection sensor at the measurement point according to a datum pose information and the measurement pose information, so that the calculation module can calculate the calculated surface difference data of the measurement point according to the pose offset variation, a detection distance from the detection sensor to the measurement point on the workpiece, and a datum reading of the measurement point, wherein the datum pose information and the datum reading are both constants.

Optionally, a standard workpiece may be arranged on the frame before the workpiece is arranged. The structure of the standard workpiece is the same as the structure of the workpiece, and the manufacturing accuracy of the standard workpiece is higher than that the manufacturing accuracy of the workpiece. The standard workpiece has a datum pose. A plurality of second feature points may be arranged on the standard workpiece. The first detection assembly can also be aligned with the second feature point, so that the first detection assembly can also obtain the datum pose information of the standard workpiece in the datum pose in a non-contact manner.

Optionally, a plurality of measurement points may be arranged on the standard workpiece, the measurement points on the standard workpiece may be arranged in one-to-one correspondence with the measurement points on the workpiece, and the detection sensor may further be configured to detect a distance from the detection sensor to the measurement point on the standard workpiece. The non-contact workpiece dimension measuring device may further include a detection workpiece, configured to detect compensated surface difference data of each measurement point when the standard workpiece is in the datum pose. The datum reading is equal to a sum of the detection distance from the detection sensor to the measurement point on the standard workpiece and the compensated surface difference data.

Optionally, the first detection assembly may include: at least two cameras, wherein one of the at least two cameras is aligned with one first feature point or one second feature point for photographing, so as to obtain an offset of the workpiece or the standard workpiece on an X axis, an offset on a Y axis, and a deflection angle around a Z axis;

- at least three datum sensors, wherein one of the at least three datum sensor is aligned with one first feature point or one second feature point for detection, so as to obtain an offset of the workpiece or the standard workpiece on the Z axis, a deflection angle around the X axis, and a deflection angle around the Y axis.

Optionally, in two adjacent detections, a difference between the readings of any datum sensor is $A_1$, a difference between the readings of one detection sensor arranged close to any datum sensor is $A_2$, and an absolute value of a difference of $A_1-A_2$ is within a first threshold range.

Optionally, the non-contact workpiece dimension measuring device may further include four pressing assemblies. The four pressing assemblies are arranged on the frame in a square shape, and the cameras are located inside the four pressing assemblies. The pressing assembly includes: a support table, arranged on the frame;

- a pressing plate and a first driving piece, wherein the first driving piece is in driving connection with the pressing plate to drive the pressing plate to rotate, move and press the workpiece, and the support table supports the workpiece; and
- a positioning pin, arranged on the frame and configured to be inserted into a positioning hole in the workpiece.

Optionally, the non-contact workpiece dimension measuring device may further include baffles. The baffles are arranged on two opposite sides of one end of the frame on the Y axis, and are configured to resist the workpiece when the workpiece is obliquely placed on the frame from top to bottom.

Optionally, the non-contact workpiece dimension measuring device may further include turning plate assemblies. The turning plate assemblies are arranged on two opposite sides of one end of the frame on the Y axis, and are arranged opposite to the baffles.

Optionally, the non-contact workpiece dimension measuring device may further include pushing and sweeping assemblies. The pushing and sweeping assemblies are arranged on two opposite sides of the other end of the frame on the Y axis, the pushing and sweeping assemblies, arranged outside the baffles, and the baffles are located on the same side of the frame, and the pushing and sweeping assemblies and the turning plate assemblies are oppositely arranged on the frame.

The present disclosure further provides a non-contact workpiece dimension measuring method, which can detect and calculate calculated surface difference data of each measurement point on a workpiece, and has high measurement accuracy.

In some other embodiments, the present disclosure provides a non-contact workpiece dimension measuring method based on the non-contact workpiece dimension measuring device as described above, including the following steps.

At S1, a datum pose information is obtained. The datum pose information includes an offset $X_1$ on an X axis, an offset $Y_1$ on a Y axis, an offset $Z_1$ on a Z axis, a deflection angle $R_{x1}$ around the X axis, a deflection angle $R_{y1}$ around the Y axis, and a deflection angle $R_{z1}$ around the Z axis of a standard workpiece when the standard workpiece is in a datum pose.

At S2, a workpiece is placed on a frame in a measurement pose, so that a first detection assembly obtains a measurement pose information of the workpiece, the measurement pose information including an offset $X_2$ on the X axis, an offset $Y_2$ on the Y axis, an offset $Z_2$ on the Z axis, a deflection angle $R_{x2}$ around the X axis, a deflection angle $R_{y2}$ around the Y axis, and a deflection angle $R_{z2}$ around the Z axis of the workpiece; and at the same time, when the workpiece is in the measurement pose, a reading $H_i$ of each detection sensor is obtained.

At S3, a calculation module subtracts the datum pose information from a corresponding measurement pose information to obtain a changed pose information. The changed pose information includes a variation $\Delta X$ on the X axis, a variation $\Delta Y$ on the Y axis, a variation $\Delta Z$ on the Z axis, a variation angle $\Delta R_x$ around the X axis, a variation angle $\Delta R_y$ around the Y axis, and a variation angle $\Delta R_z$ around the Z axis.

At S4, according to the following calculation formula:

$$(\Delta X, \Delta Y, \Delta Z, \Delta R_x, \Delta R_y, \Delta R_z)\begin{bmatrix} k_{i11} & \dots & k_{i16} \\ \vdots & \dots & \vdots \\ k_{i61} & \dots & k_{i66} \end{bmatrix} = (X_1, Y_1, Z_1 + h_{0i}, R_{x1}, R_{y1}, R_{z1}),$$

the calculation module calculates a pose offset variation $h_{0i}$ of the detection sensor at each measurement point, wherein i is a position sequence number of the measurement point, $k_{i11}$–$k_{i66}$ at the same measurement point are fixed values, and $k_{i11}$–$k_{i66}$ at different measurement points are different.

At S5, according to the following calculation formula:

$$\mu_i = H_{i0} - H_i - h_{0i},$$

the calculation module calculates calculated surface difference data $\mu_i$ of each measurement point, and when the calculated surface difference data $\mu_i$ of all the measurement points are within a preset range, the external dimension of the workpiece is qualified, wherein $H_{i0}$ is a datum reading of the measurement point.

Optionally, the following steps may be included between the S1 and the S2.

At S11, a detection distance $h_i$ from the detection sensor to the measurement point on the standard workpiece is obtained.

At S12, compensated surface difference data $\alpha_i$ of the measurement point on the standard workpiece is measured by using a detection workpiece.

At S13, according to the following calculation formula:

$$H_{i0} = h_i + \alpha_i,$$

the calculation module calculates the datum reading of each measurement point.

Optionally, at the same measurement point, an absolute value of a difference between the calculated surface difference data $\mu_i$ of the workpiece and the compensated surface difference data $\alpha_i$ of the standard workpiece may be within a second threshold range.

Optionally, in S1, the standard workpiece may be placed on the frame in the datum pose, so that the first detection assembly obtains the datum pose information of the standard workpiece.

The present disclosure has at least the following beneficial effects.

The workpiece is arranged on the frame, the plurality of first feature points and the plurality of measurement points are arranged on the workpiece, and the first detection assembly is arranged on the frame and aligned with the first feature point, so that the first detection assembly can obtain the measurement pose information of the workpiece in the measurement pose in a non-contact manner. At the same time, the plurality of detection sensors of the second detection assembly are arranged on the frame in a distributed manner, one detection sensor is aligned with one measurement point, and the detection sensor can detect the distance from the detection sensor to the measurement point on the workpiece, that is, the detection sensor is not in contact with the workpiece. Then, the calculation module calculates the pose offset variation of the detection sensor according to the datum pose information and the measurement pose information, and the calculation module calculates the calculated surface difference data of the measurement point according to the pose offset variation, the detection distance from the detection sensor to the measurement point on the workpiece, and the datum reading of the measurement point, so as to obtain the calculated surface difference data of each the measurement point. When the calculated surface difference data of all the measurement points are within the preset range, it indicates that the external dimension of the workpiece is qualified, and there is no obvious surface shape change on the workpiece. In this way, the external dimension of the workpiece is detected and calculated by using the first detection assembly, the second detection assembly, and the calculation module, and the contact with the workpiece is not needed in the whole process, thereby avoiding the problems of detection errors caused by contact with the workpiece and poor measurement accuracy caused by human measurement differences of the measurement personnel in the related art, so that the measurement accuracy is better; and at the same time, due to no need for contact with the workpiece, the workpiece cannot be deformed and damaged.

ILLUSTRATION OF REFERENCE SIGNS

1—Frame;

21—Camera; 211—Fourth driving piece; 212—Light source; 213—Third shielding plate; 214—Temperature sensor; 215—Connecting plate; 216—Camera mounting bracket; 22—Datum sensor;

31—Detection sensor;

4—Pressing assembly;

5—Turning plate assembly; 51—Second driving piece; 52—First shielding plate; 53—First mounting plate; 54—First pin shaft; 55—Second pin shaft; 56—First connecting rod; 57—Third pin shaft; 58—Connecting block; 59—Second connecting rod;

6—Pushing and sweeping assembly; 61—Third driving piece; 62—Second shielding plate; 63—Second sensor mounting seat; 64—Second mounting plate;

7—Baffle; 8—Code scanner;

9—Water blowing assembly.

DETAILED DESCRIPTION OF THE EMBODIMENTS

All features disclosed in the present specification, or steps in all methods or processes disclosed, except mutually exclusive features and/or steps, may be combined in any manner.

Any feature disclosed in the present specification, unless otherwise stated, may be replaced with other equivalent or similar alternative features. That is, unless otherwise stated, each feature is only an example of a series of equivalent or similar features. Throughout the specification, the same reference sign indicates the same element.

In order to make the technical problems solved, the technical solutions adopted, and the technical effects achieved of the present disclosure clearer, the technical solutions of the present disclosure are further described below in conjunction with the accompanying drawings and specific implementations.

A non-contact workpiece dimension measuring device provided by some embodiments of the present disclosure will be described in detail below with reference to the accompanying drawings.

The embodiments of the present disclosure provide a non-contact workpiece dimension measuring device, which is configured to measure the external dimension of a workpiece, has relatively high measurement accuracy and efficiency, and does not damage the workpiece. Measurement of the external dimension of the workpiece specifically refers to detecting and calculating calculated surface difference data at each measurement point on the workpiece. If the calculated surface difference data of all the measurement points are within a preset range, it indicates that the external dimension of the workpiece is qualified. In this embodiment, the workpiece is specifically a body housing manufactured by die casting, that is, the workpiece is of a special-shaped structure.

Figure 1:
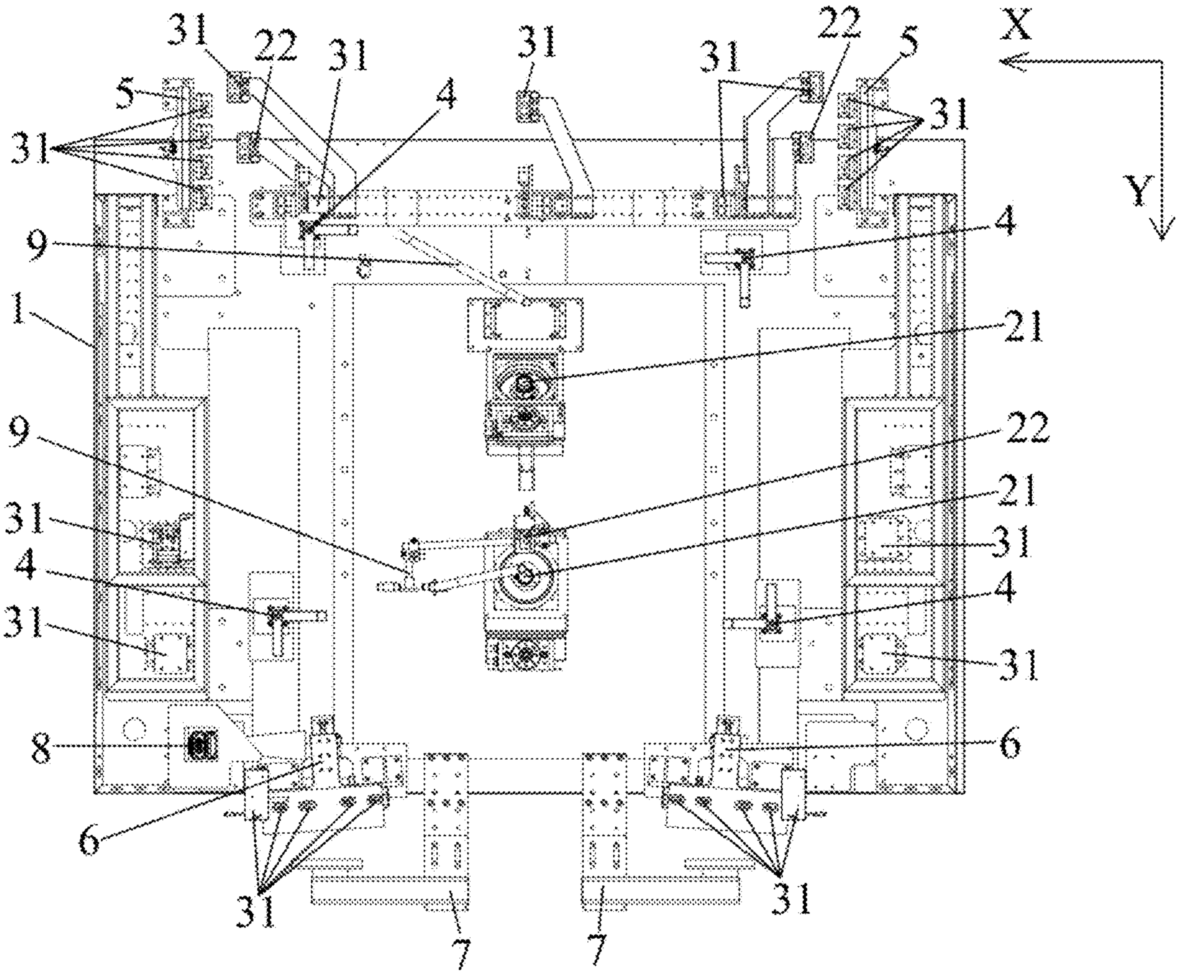
FIG. 1 is a top view of a non-contact workpiece dimension measuring device provided by the present disclosure.

Specifically, as shown in FIG. 1, the non-contact workpiece dimension measuring device includes a frame 1, a first detection assembly, a second detection assembly, and a calculation module. The workpiece having a measurement pose is arranged on the frame 1, a plurality of first feature points and a plurality of measurement points are arranged on the workpiece, and the measurement points of the workpiece are easily deformable points on the workpiece. The first detection assembly is arranged on the frame 1 and aligned with the first feature point, and the first detection assembly can obtain a measurement pose information of the workpiece in the measurement pose in a non-contact manner. The second detection assembly includes a plurality of detection sensors 31. The plurality of detection sensors 31 are arranged on the frame 1 in a distributed manner, one detection sensor 31 is aligned with one measurement point, and the detection sensor 31 is configured to detect a distance therefrom to the measurement point on the workpiece. The calculation module is configured to calculate a pose offset variation of the detection sensor 31 at each measurement point according to a datum pose information and the measurement pose information, so that the calculation module can calculate calculated surface difference data of each measurement point according to the pose offset variation, the detection distance from the detection sensor 31 to the measurement point on the workpiece, and a datum reading of the measurement point.

The datum pose information and the datum reading are both constants. The datum reading is only related to a position sequence number of the measurement point, that is, the datum reading is only related to the position of the measurement point. After the position of the measurement point is determined, the sequence number of the measurement point is also determined, and the datum reading of the measurement point is also determined and remains unchanged, that is, the measurement point at one position corresponds to one datum reading, and the datum reading of the measurement point at this position remains unchanged.

The workpiece is arranged on the frame 1, the plurality of first feature points and the plurality of measurement points are arranged on the workpiece, and the first detection assembly is arranged on the frame 1 and aligned with the first feature point, so that the first detection assembly can obtain the measurement pose information of the workpiece in the measurement pose in a non-contact manner. At the same time, the plurality of detection sensors 31 of the second detection assembly are arranged on the frame 1 in a distributed manner, one detection sensor 31 is aligned with one measurement point, and the detection sensor 31 can detect the distance therefrom to the measurement point on the workpiece, that is, the detection sensor 31 is not in contact with the workpiece. Then, the calculation module calculates the pose offset variation of the detection sensor 31 according to the datum pose information and the measurement pose information, and the calculation module calculates the calculated surface difference data of the measurement point according to the pose offset variation, the detection distance from the detection sensor 31 to the measurement point on the workpiece, and the datum reading of the measurement point, so as to obtain the calculated surface difference data of each measurement point. When the calculated surface difference data of all the measurement points are within the preset range, it indicates that the external dimension of the workpiece is qualified, and there is no obvious surface shape change on the workpiece. In this way, the external dimension of the workpiece is detected and calculated by using the first detection assembly, the second detection assembly, and the calculation module, and the contact with the workpiece is not needed in the whole process, thereby avoiding the problems of detection errors caused by contact with the workpiece and poor measurement accuracy caused by human measurement differences of the measurement personnel in the related art, so that the measurement accuracy is better. At the same time, due to no need for contact with the workpiece, the workpiece cannot be deformed and damaged. The measurement pose information specifically refers to a state of the workpiece in space, including six degrees of freedom of the workpiece in space.

In some embodiments, a standard workpiece is arranged on the frame 1 before the workpiece is arranged, the structure of the standard workpiece is the same as that of the workpiece, and the manufacturing accuracy of the standard workpiece is higher than that of the workpiece, that is, the standard workpiece is a workpiece manufactured with relatively ideal machining accuracy. The standard workpiece has a datum pose, a plurality of second feature points are arranged on the standard workpiece, and the first detection assembly can also be aligned with the second feature point, so that the first detection assembly can also obtain the datum pose information of the standard workpiece in the datum pose in a non-contact manner, thereby obtaining the datum pose information. That is, the datum pose information is only related to the standard workpiece, and after the standard workpiece is determined, the datum pose information is also determined, that is, the reading of the first detection assembly corresponding to the datum pose is a fixed value, i.e., a constant. A plurality of measurement points are also arranged on the standard workpiece, and the measurement points on the standard workpiece are arranged in one-to-one correspondence with the measurement points on the workpiece. For example, one measurement point is arranged at the position on the workpiece, and one measurement point is also arranged at one corresponding position on the standard workpiece. In addition, the detection sensor 31 can also detect the detection distance therefrom to the measurement point on the standard workpiece.

Specifically, the non-contact workpiece dimension measuring device further includes a detection workpiece. The detection workpiece is configured to detect compensated surface difference data of each measurement point when the standard workpiece is in the datum pose, that is, one measurement point corresponds to one compensated surface difference data, and the datum reading of one measurement point is equal to a sum of the detection distance from the detection sensor 31 at the measurement point to the measurement point on the standard workpiece and the compensated surface difference data of the measurement point, so that the datum reading of each measurement point can be calculated by the calculation module. The calculation module adopts a common calculation module structure in the related art. The detection workpiece is specifically a common three-dimensional measurement (GOM) system in the related art, and the compensated surface difference data of the standard workpiece at each measurement point can be directly measured by the GOM system. Due to the difference between 3D digital models of the standard workpiece and the workpiece, the difference data may be obtained through the GOM system, that is, the compensated surface difference data of the standard workpiece is obtained, so that the accuracy of the calculated surface difference data measured by the 3D digital model of the workpiece can be ensured.

It is to be noted that in the process of measuring the external dimension of the workpiece, not only the compensated surface difference data of the workpiece at each measurement point needs to be considered, but also the pose offset variation of the detection sensor 31 at each measurement point needs to be considered, so as to ensure that the calculated surface difference data obtained by calculation can accurately reflect the external dimension of the workpiece. If the compensated surface difference data measured by the GOM system is directly used as the criteria for the external dimension of the workpiece, the problem of inaccurate determination is prone to occurring, so that the accuracy of the measurement of the external dimension of the workpiece can be ensured by the calculated surface difference data.

It is to be noted that when an absolute value of a difference between the calculated surface difference data of the workpiece and the compensated surface difference data of the standard workpiece at the same measurement point is within a second threshold range, it indicates that the result of the calculated surface difference data of the workpiece is relatively accurate, that is, the calculated surface difference data does not have a large deviation relative to the compensated surface difference data, that is, the accuracy and reliability of the calculated surface difference data of the workpiece measurement point detected and calculated by the non-contact workpiece dimension measuring device in this embodiment are relatively high. The second threshold is specifically 0 to 0.2 mm.

In this embodiment, as shown in FIG. 1, due to the fact that the workpiece has twenty-six easily deformable positions, correspondingly, the workpiece and the standard workpiece respectively have twenty-six measurement points, twenty-six detection sensors 31 are also provided, and one detection sensor 31 is arranged at one measurement point. In other embodiments, other numbers of detection sensors 31 may also be arranged, and the arrangement number and positions of the detection sensors 31 need to be determined according to the specific structure of the workpiece. In this embodiment, the detection sensor 31 is specifically a ranging sensor.

In some embodiments, as shown in FIG. 1, the first detection assembly includes at least two cameras 21 and at least three datum sensors 22. One camera 21 is aligned with one first feature point or one second feature point, the plurality of cameras 21 can respectively photograph the plurality of first feature points or the plurality of second feature points, and compare and analyze image information of the plurality of first feature points or the plurality of second feature points obtained by photographing, so as to obtain an offset of the workpiece or the standard workpiece on an X axis, an offset on a Y axis, and a deflection angle around a Z axis. One datum sensor 22 is aligned with one first feature point or one second feature point, and the plurality of datum sensors 22 can respectively detect the plurality of first feature points or the plurality of second feature points, and compare and analyze the image information of the plurality of first feature points or the plurality of second feature points obtained by detection, so as to obtain an offset of the workpiece or the standard workpiece on the Z axis, a deflection angle around the X axis, and a deflection angle around the Y axis, thereby obtaining the measurement pose information of the workpiece in the measurement pose and the datum pose information of the standard workpiece in the datum pose in a non-contact manner through the first detection assembly.

In this embodiment, two cameras 21 and three datum sensors 22 are arranged, and the two cameras 21 and the three datum sensors 22 are all located at each first feature point on the workpiece or each second feature point on the standard workpiece. The first feature point may be a datum point or a measurement point or any other point on the workpiece, as long as the pose feature of the workpiece can be reflected, and the hardness of the datum point is greater than that of the measurement point. The second feature point may be a datum point or a measurement point or any other point on the standard workpiece, as long as the pose feature of the standard workpiece can be reflected. The arrangement positions and number of the first feature points and the second feature points are not specifically limited herein. In other embodiments, three cameras 21 and four datum sensors 22 may also be arranged, so that the obtained datum pose information and measurement pose information are more accurate, and the arrangement number of the cameras 21 and the datum sensors 22 is not specifically limited.

In some embodiments, in two adjacent detections, a difference between the readings of any datum sensor 22 is $A_1$, a difference between the readings of one detection sensor 31 closest to the datum sensor 22 is $A_2$, and an absolute value of a difference of $A_1-A_2$ is within a first threshold range, which indicates that the detection value of each detection sensor 31 is relatively accurate for subsequent calculation of the calculated surface difference data. That is, the non-contact workpiece dimension measuring device works normally and can play a role in measuring the surface difference data, and can further ensure the accuracy of the measurement of the surface difference data, indicating that the apparatus and method also play a role of self-monitoring in practical applications. The first threshold may specifically be 0.2 cm to 1 cm.

Optionally, as shown in FIG. 1, the non-contact workpiece dimension measuring device further includes four pressing assemblies 4. The four pressing assemblies 4 are arranged on the frame 1 in a square shape, and two cameras 21 are located inside the four pressing assemblies 4 at intervals. The pressing assemblies 4 are configured to limit the workpiece on the frame 1 to ensure the stability of the workpiece on the frame 1 in the entire measurement process.

Specifically, the pressing assembly 4 includes a support table, a pressing plate, a first driving piece, and a positioning pin. The support table is arranged on the frame 1 along the Z axis. A fixed end of the first driving piece is arranged on the frame 1, a driving end of the first driving piece is in driving connection with the pressing plate, and the first driving piece is configured to drive the pressing plate to rotate, so that the pressing plate can move and press the workpiece. At this time, the support table can provide support for the workpiece to avoid the problem of bending or deformation of the pressing plate when the pressing plate presses the workpiece. The positioning pin is arranged on the frame 1 and configured to be inserted into a positioning hole in the workpiece to position the workpiece on the pressing assembly 4.

The first driving piece may specifically be a rotating cylinder. When the workpiece is placed on the frame 1 from top to bottom, the rotating cylinder can drive the pressing plate to rotate in a direction away from the workpiece to avoid the pressing plate interfering with the placement of the workpiece. When the workpiece is placed, the rotating cylinder drives the pressing plate to rotate in a direction close to the workpiece and press the workpiece.

In some embodiments, as shown in FIG. 1, the workpiece is obliquely placed on the frame 1 from top to bottom, so that the non-contact workpiece dimension measuring device further includes baffles 7. The baffles 7 are respectively arranged on two opposite sides of one end of the frame 1 on the Y axis. The baffles 7 are configured to resist the workpiece when the workpiece is obliquely placed on the frame 1 from top to bottom, so as to avoid the problem of the workpiece falling in the process of placing the workpiece, thereby ensuring the stability of workpiece placement.

Specifically, in the process of placing the workpiece on the frame 1 from top to bottom, debris may fall downward from the position of the workpiece where debris easily falls, and the fallen debris easily falls on some detection sensors 31, thereby affecting the detection accuracy of the detection sensors 31.

Figure 2:
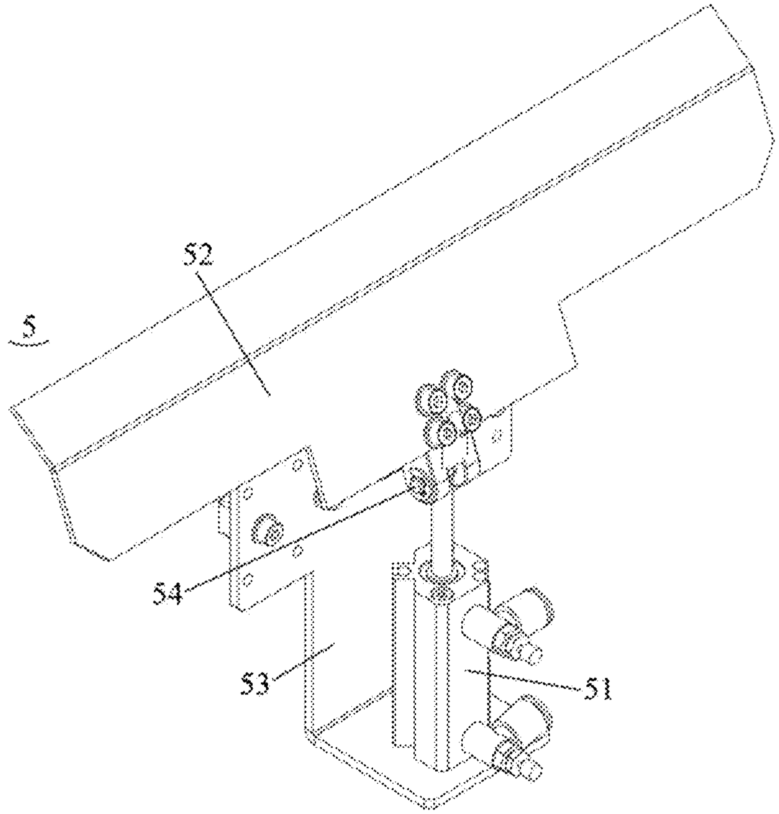
FIG. 2 is a schematic structural diagram of a turning plate assembly (in an open state) provided by the present disclosure.
Figure 3:
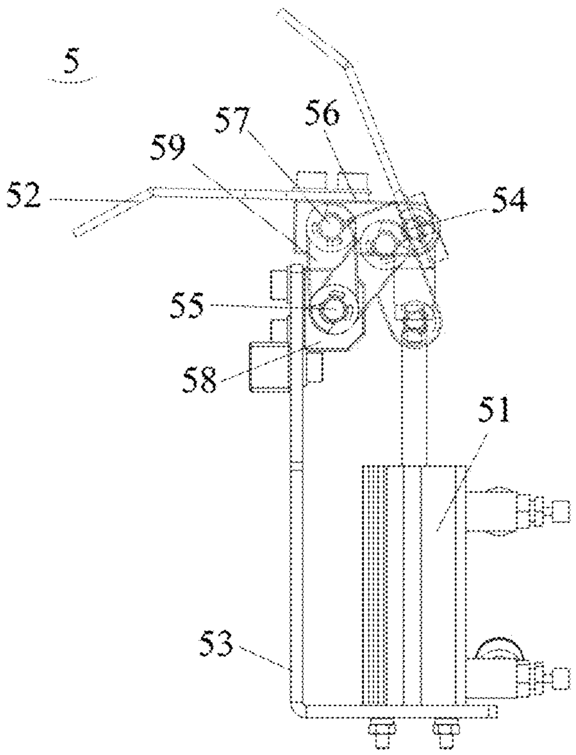
FIG. 3 is a side view of a turning plate assembly ((including a shielding state and an open state) provided by the present disclosure.

In order to solve the above problems, as shown in FIG. 1 to FIG. 3, the non-contact workpiece dimension measuring device further includes turning plate assemblies 5. The turning plate assemblies 5 are respectively arranged on two opposite sides of one end of the frame 1 on the Y axis, and the turning plate assemblies 5 are arranged opposite to the baffles 7. The turning plate assembly 5 has a shielding state and an open state. In the process of placing the workpiece, the turning plate assembly 5 is in the shielding state, so as to shield the plurality of detection sensors 31 arranged around the turning plate assembly 5, and the plurality of detection sensors 31 are arranged in parallel on a left side of the turning plate assembly 5. After the workpiece is placed on the frame 1, the turning plate assembly 5 is in the open state, and the turning plate assembly 5 does not shield the plurality of detection sensors 31 arranged around the turning plate assembly 5, so that the detection sensors 31 can perform normal detection work.

By arranging the turning plate assembly 5, in the process of placing the workpiece, the turning plate assembly 5 can protect the detection sensor 31 from being affected by the debris falling from the workpiece, thereby ensuring the normal performance of the detection sensor 31. When the detection sensor 31 needs to perform detection work, the turning plate assembly 5 does not shield the detection sensor 31, thereby avoiding affecting the performance of the detection sensor 31, and prolonging the service life of the detection sensor 31.

In some embodiments, as shown in FIG. 2 and FIG. 3, the turning plate assembly 5 includes a first mounting plate 53, a second driving piece 51, a first shielding plate 52, a first pin shaft 54, a second pin shaft 55, a third pin shaft 57, a connecting block 58, a first connecting rod 56, and a second connecting rod 59. The first mounting plate 53 is arranged on a first sensor mounting seat of the plurality of detection sensors 31 arranged around the turning plate assembly 5, and the first sensor mounting seat is fixedly arranged on the frame 1. A fixed end of the second driving piece 51 is arranged on the first mounting plate 53, a driving end of the second driving piece 51 is in driving connection with the first pin 54, and a connecting block 58 is fixedly arranged on the first mounting plate 53. The second pin shaft 55 is arranged on the connecting block 58, the third pin shaft 57 is located between the first pin shaft 54 and the second pin shaft 55, both ends of the first connecting rod 56 are respectively movably arranged on the first pin shaft 54 and the third pin shaft 57, both ends of the second connecting rod 59 are respectively movably arranged on the third pin shaft 57 and the second pin shaft 55, and the first shielding plate 52 is fixedly arranged on the first connecting rod 56. The second driving piece 51 is configured to drive the first pin shaft 54, the first connecting rod 56, and the first shielding plate 52 to move along the Z axis, so that the first connecting rod 56 and the second connecting rod 59 can be arranged perpendicular to each other or at an acute angle, thereby enabling the first shielding plate 52 to horizontally shield or be obliquely opened relative to the plurality of detection sensors 31 arranged around the first shielding plate 52. The first shielding plate 52 is a bent plate. The second driving piece 51 may specifically be a vertical cylinder, and the first shielding plate 52 can shield four detection sensors 31 arranged around the first shielding plate 52.

The second connecting rod 59 may further be arranged on the other side of the connecting block 58, so that both ends of the second connecting rod 59 are respectively movably arranged on the other ends of the second pin shaft 55 and the third pin shaft 57, thereby ensuring the support stability of the movement of the first shielding plate 52.

It is to be noted that the specific arrangement positions and number of the turning plate assemblies 5 on the frame 1 are not limited, as long as the turning plate assembly 5 is arranged at each detection sensor 31 below the position of the workpiece where debris easily falls, and the number of the detection sensors 31 arranged around the turning plate assembly 5 is not limited, as long as it is ensured that the turning plate assembly 5 can shield and protect each detection sensor 31 arranged around the turning plate assembly.

Figure 4:
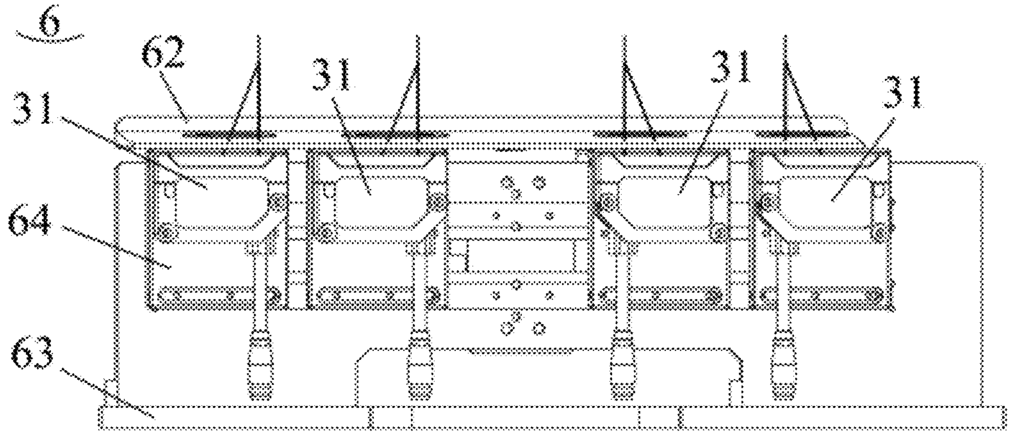
FIG. 4 is a schematic structural diagram of a pushing and sweeping assembly provided by the present disclosure.
Figure 5:
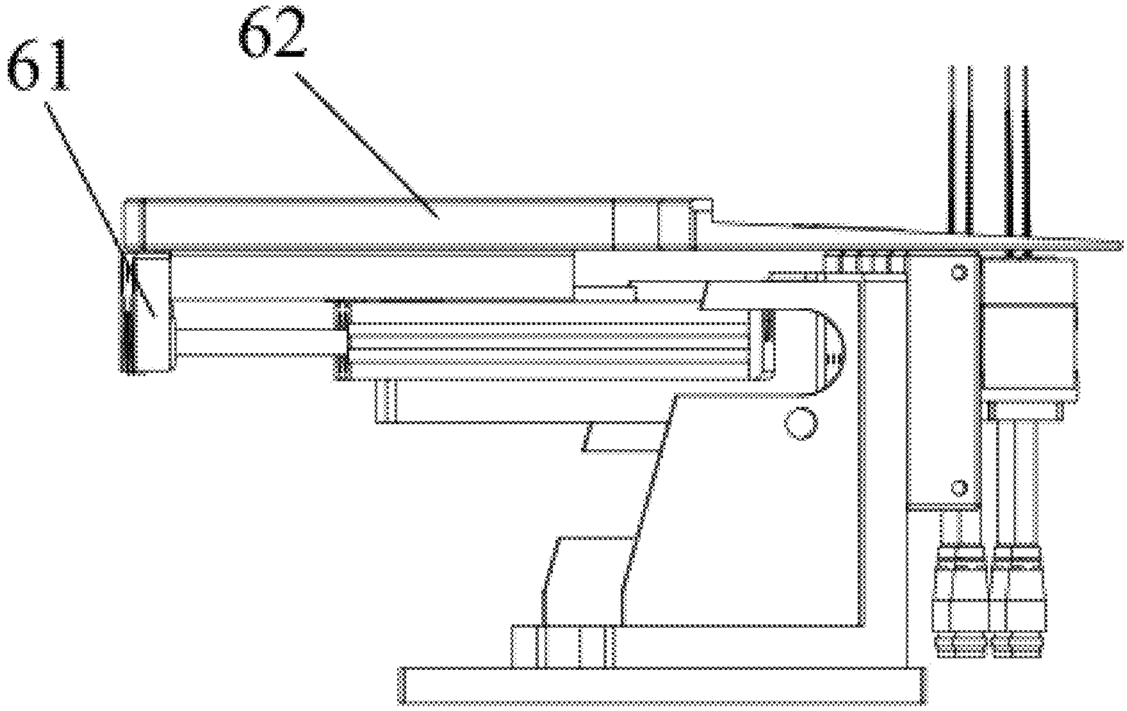
FIG. 5 is a schematic structural diagram of a third driving piece and a second shielding plate provided by the present disclosure.

In some embodiments, as shown in FIG. 1, FIG. 4, and FIG. 5, the non-contact workpiece dimension measuring device further includes pushing and sweeping assemblies 6. The pushing and sweeping assemblies 6 are respectively arranged on two opposite sides of the other end of the frame 1 on the Y axis, the pushing and sweeping assemblies 6, arranged outside the baffles 7, and the baffles 7 are located on the same side of the frame 1, and the pushing and sweeping assemblies 6 and the turning plate assemblies 5 are oppositely arranged on the frame 1. The pushing and sweeping assembly 6 has an extended state and a retracted state. In the process of placing the workpiece, the pushing and sweeping assembly 6 is in the retracted state, so as to shield the plurality of detection sensors 31 arranged around the pushing and sweeping assembly 6, and the plurality of detection sensors 31 are arranged in parallel at a front end of the pushing and sweeping assembly 6. After the workpiece is placed on the frame 1, the pushing and sweeping assembly 6 is in the extended state, and the pushing and sweeping assembly 6 does not shield the plurality of detection sensors 31 arranged around the pushing and sweeping assembly 6, so that the detection sensors 31 can perform normal detection work. The extended state and the retracted state of the pushing and sweeping assembly 6 are merely two relatively arranged states, as long as it is ensured that when the pushing and sweeping assembly 6 is in the retracted state, the plurality of detection sensors 31 arranged around the pushing and sweeping assembly 6 can be shielded, and when the pushing and sweeping assembly 6 in the extended state, the plurality of detection sensors 31 arranged around the pushing and sweeping assembly 6 are no longer shielded.

By arranging the pushing and sweeping assembly 6, in the process of placing the workpiece, the pushing and sweeping assembly 6 can protect the detection sensor 31 from being affected by the debris falling from the workpiece, thereby ensuring the normal performance of the detection sensor 31. When the detection sensor 31 needs to perform detection work, the pushing and sweeping assembly 6 does not shield the detection sensor 31, thereby avoiding affecting the performance of the detection sensor 31, and prolonging the service life of the detection sensor 31.

Specifically, as shown in FIG. 4 and FIG. 5, the pushing and sweeping assembly 6 includes a second sensor mounting seat 63, a second mounting plate 64, a third driving piece 61, and a second shielding plate 62. The second sensor mounting seat 63 is fixedly arranged on the frame 1, the second mounting plate 64 is arranged on the second sensor mounting seat 63, and the plurality of detection sensors 31 are arranged on the second mounting plate 64. A fixed end of the third driving piece 61 is arranged on the second mounting plate 64, a driving end of the third driving piece 61 is in driving connection with the second shielding plate 62, and the third driving piece 61 is configured to drive the second shielding plate 62 to horizontally retract or extend relative to the plurality of detection sensors 31 on the second mounting plate 64. The third driving piece 61 may specifically be a horizontal cylinder, and four detection sensors 31 are arranged on the second mounting plate 64, that is, the second shielding plate 62 can shield four detection sensors 31 on the second mounting plate 64.

It is to be noted that the specific arrangement positions and number of the pushing and sweeping assemblies 6 on the frame 1 are not limited, as long as the pushing and sweeping assembly 6 is arranged at each detection sensor 31 below the position of the workpiece where debris easily falls, and the number of the detection sensors 31 arranged around the pushing and sweeping assembly 6 is not limited, as long as it is ensured that the pushing and sweeping assembly 6 can shield and protect each detection sensor 31 arranged around the pushing and sweeping assembly.

In some embodiments, as shown in FIG. 1, the non-contact workpiece dimension measuring device further includes a water blowing assembly 9. The water blowing assembly 9 is arranged on the frame 1 and located on one side of the camera 21. The water blowing assembly 9 is configured to blow away water droplets on the workpiece, so that the camera 21 can photograph clearly, thereby ensuring the photographic effect of the camera 21.

Specifically, the water blowing assembly 9 includes an air source and an air pipe. One end of the air pipe is connected to the air source, and the other end of the air pipe is arranged above the workpiece. The air source is configured to provide purge gas for the air pipe, so that the purge gas in the air pipe can blow away the water droplets on the workpiece, which is beneficial to photographing of the camera 21.

Figure 6:
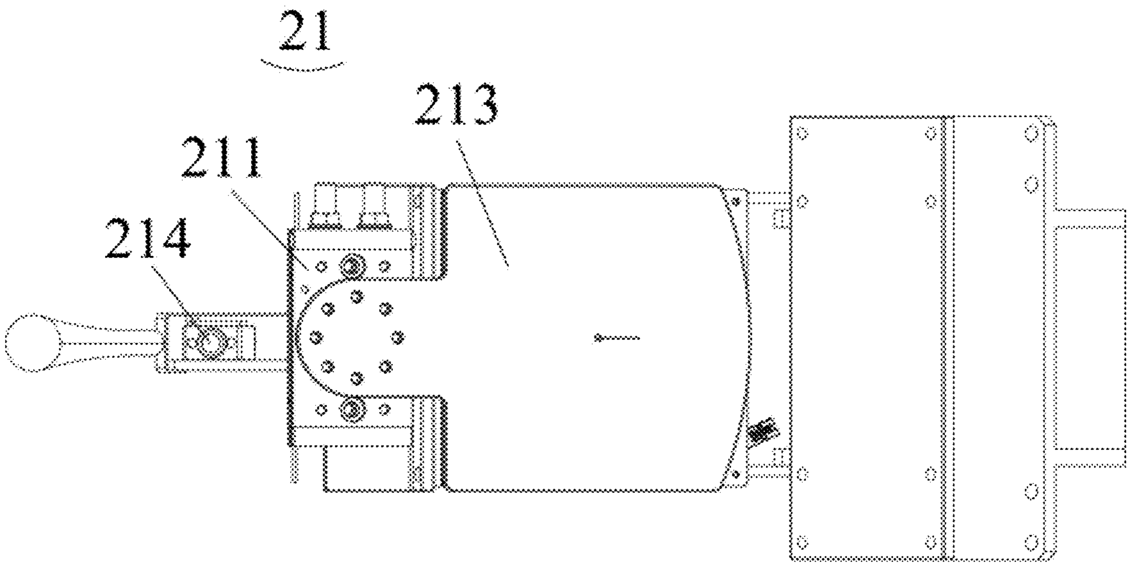
FIG. 6 is a schematic structural diagram of a camera provided by the present disclosure.
Figure 7:
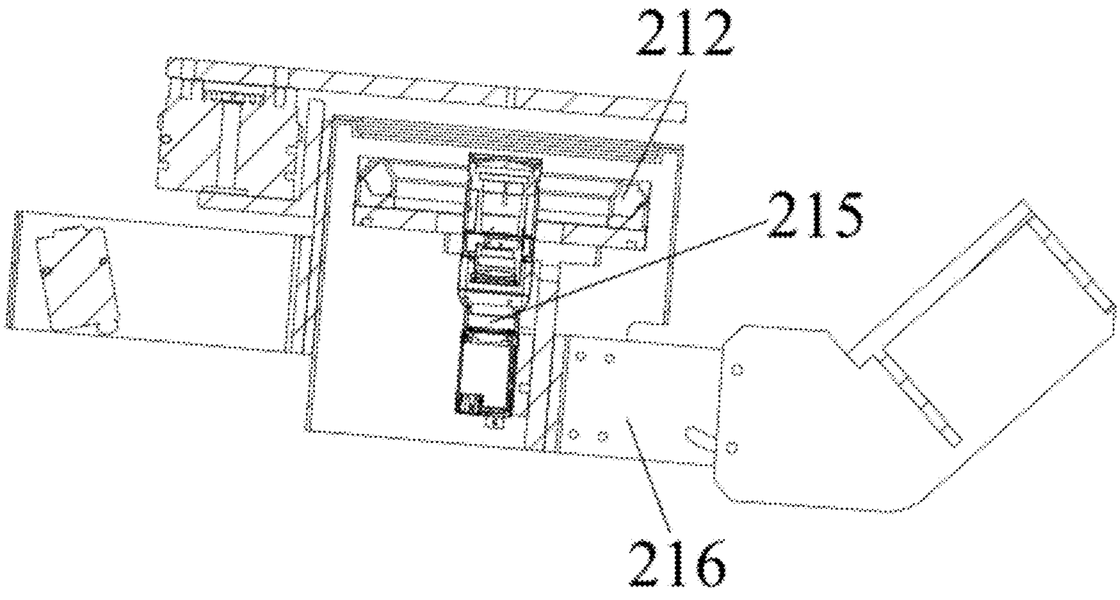
FIG. 7 is a section view of FIG. 6.

In some embodiments, as shown in FIG. 1, FIG. 6, and FIG. 7, the camera 21 includes a camera body, a fourth driving piece 211, a light source 212, a third shielding plate 213, a temperature sensor 214, a connecting plate 215, and a camera mounting bracket 216. The connecting plate 215 is connected to the frame 1, the connecting plate 215 is connected to the camera mounting bracket 216, the temperature sensor 214 and the light source 212 are both arranged on the connecting plate 215, and the camera body is mounted on the camera mounting frame 216. A fixed end of the fourth driving piece 211 is arranged on the connecting plate 215, and a driving end of the fourth driving piece 211 is in driving connection with the third shielding plate 213. The fourth driving piece 211 is configured to drive the third shielding plate 213 to rotate, so that the third shielding plate 213 can rotate, thereby enabling the third shielding plate 213 to shield or not shield the light source 212 and the camera body. The light source 212 is configured to provide light for the camera body during photographing. The temperature sensor 214 is configured to detect the temperature of the workpiece to avoid the temperature of the workpiece being too high in the process of photographing the workpiece by the camera body. The fourth driving piece 211 may specifically be a rotating cylinder. The camera body is specifically a Charge Coupled Device (CCD) camera.

In some embodiments, as shown in FIG. 1, a code scanner 8 is further arranged on the frame 1 to scan a two-dimensional code on the workpiece, so as to obtain information of the workpiece, thereby facilitating rapid tracing of the workpiece. The code scanner 8 adopts a common code scanning structure in the related art.

It is to be noted that the limit arrangement of the standard workpiece on the frame 1 is the same as the limit arrangement of the workpiece on the frame 1, which may specifically refer to the above description of the limit arrangement of the workpiece on the frame 1.

A non-contact workpiece dimension measuring method provided by some other embodiments of the present disclosure will be described in detail below with reference to the accompanying drawings.

Figure 8:
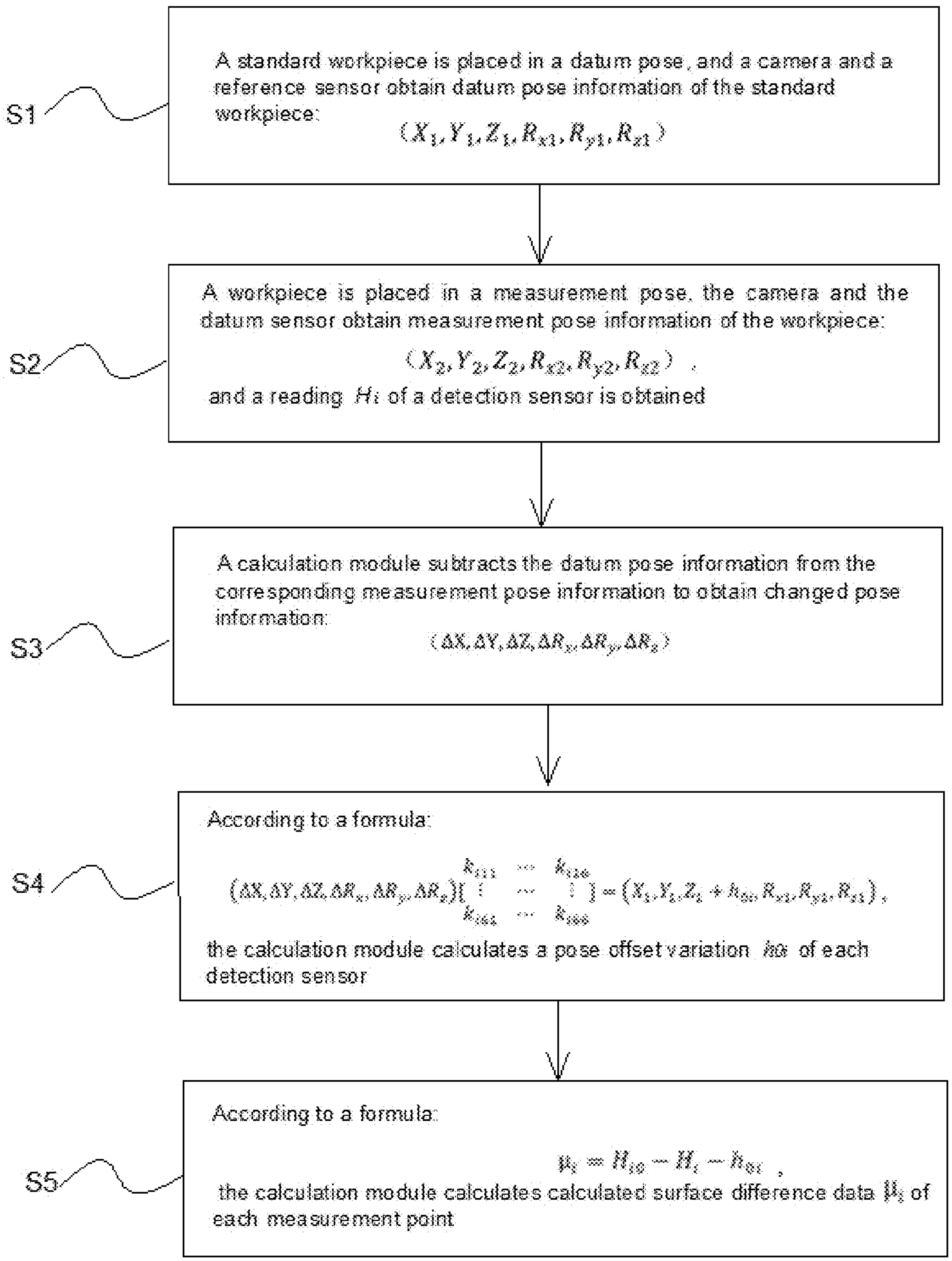
FIG. 8 is a first schematic flowchart of a non-contact workpiece dimension measuring method provided by the present disclosure.

In some embodiments of the present disclosure, a non-contact workpiece dimension measuring method is provided, which is based on the non-contact workpiece dimension measuring device provided in the above embodiment for detecting and calculating calculated surface difference data of twenty-six measurement points on a workpiece. As shown in FIG. 8, the non-contact workpiece dimension measuring method includes the following steps.

At S1, a standard workpiece is placed on a frame 1 in a datum pose, so that four pressing assemblies 4 on the frame 1 limit the standard workpiece on the frame 1; and then two cameras 21 and three datum sensors 22 in a first detection assembly obtain datum pose information of the standard workpiece. The datum pose information includes an offset $X_1$ on an X axis, an offset $Y_1$ on a Y axis, an offset $Z_1$ on a Z axis, a deflection angle $R_{x1}$ around the X axis, a deflection angle $R_{y1}$ around the Y axis, and a deflection angle $R_{z1}$ around the Z axis of the standard workpiece.

At S2, the workpiece is placed on the frame 1 in a measurement pose, so that the four pressing assemblies 4 on the frame 1 limit the workpiece on the frame 1; and then the two cameras 21 and the three datum sensors 22 obtain measurement pose information of the workpiece, the measurement pose information including an offset $X_2$ on the X axis, an offset $Y_2$ on the Y axis, an offset $Z_2$ on the Z axis, a deflection angle $R_{x2}$ around the X axis, a deflection angle $R_{y2}$ around the Y axis, and a deflection angle $R_{z2}$ around the Z axis of the workpiece; and at the same time, when the workpiece is in the measurement pose, a reading $H_i$ of each detection sensor 31 is obtained.

At S3, a calculation module subtracts the datum pose information from the corresponding measurement pose information to obtain changed pose information. The changed pose information includes a variation ΔX on the X axis, a variation ΔY on the Y axis, a variation ΔZ on the Z axis, a variation angle $\Delta R_x$ around the X axis, a variation angle $\Delta R_y$ around the Y axis, and a variation angle $\Delta R_x$ around the Z axis. $\Delta X=X_1-X_2$, $\Delta Y=Y_1-Y_2$, $\Delta Z=Z_1-Z_2$. $\Delta R_x=R_{x1}-R_{x2}$, $\Delta R_y=R_{y1}-R_{y2}$, $\Delta R_z=R_{z1}-R_{z2}$.

At S4, according to the following calculation formula:

$$(\Delta X, \Delta Y, \Delta Z, \Delta R_x, \Delta R_y, \Delta R_z)\begin{bmatrix} k_{i11} & \dots & k_{i16} \\ \vdots & \dots & \vdots \\ k_{i61} & \dots & k_{i66} \end{bmatrix} = (X_1, Y_1, Z_1 + h_{0i}, R_{x1}, R_{y1}, R_{z1}),$$

the calculation module calculates a pose offset variation $h_{0i}$ of the detection sensor 31 at each measurement point, wherein i is a position sequence number of the measurement point, $k_{i11}$–$k_{i66}$ are all constants, and one measurement point corresponds to a group of $k_{i11}$–$k_{i66}$, that is, $k_{i11}$–$k_{i66}$ at different measurement points are different, that is, $k_{i11}$–$k_{i66}$ corresponding to different measurement points are fixed values, i.e., constants.

At S5, according to the following calculation formula:

$$\mu_i = H_{i0} - H_i - h_{0i},$$

the calculation module calculates calculated surface difference data $\mu_i$ of each measurement point, and when the calculated surface difference data $\mu_i$ of all measurement points are within a preset range, the external dimension of the workpiece is qualified, where $H_{i0}$ is a datum reading of the measurement point.

That is, if the twenty-six pieces of calculated surface difference data $\mu_1$~$\mu_{26}$ calculated by the calculation formula $\mu_i=H_{i0}-H_i-h_{0i}$ are all within the preset range, it indicates that the workpiece has no obvious surface shape change and the external dimension of the workpiece is qualified; and if any one of $\mu_1$~$\mu_{26}$ is not within the preset range, it indicates that the external dimension of the workpiece is unqualified. The preset range is −2 mm≤$\mu_1$~$\mu_{26}$≤2 mm.

Figure 9:
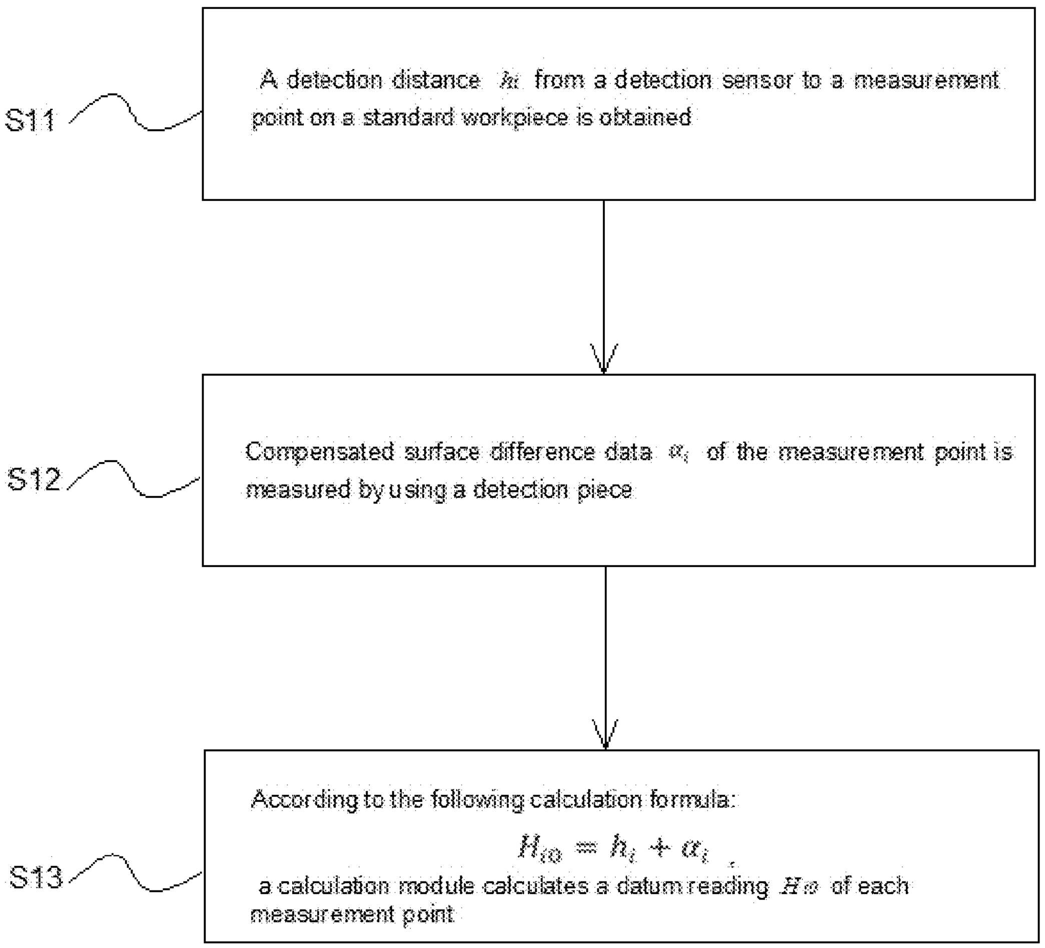
FIG. 9 is a second schematic flowchart of a non-contact workpiece dimension measuring method provided by the present disclosure.

In some embodiments, as shown in FIG. 9, the following steps are further included between step S1 and step S2.

At S11, a detection distance $h_i$ from the detection sensor 31 to the measurement point on the standard workpiece when the standard workpiece is in the datum pose is obtained.

At S12, compensated surface difference data $\alpha_i$ of the measurement point is measured by using a detection workpiece.

At S13, according to the following calculation formula:

$$H_{i0} = h_i + \alpha_i,$$

the calculation module calculates the datum reading $H_{i0}$ of each measurement point, that is, the datum readings $H_{10}$~$H_{260}$ of the twenty-six measurement points can be respectively calculated according to the calculation formula $H_{i0}=h_i+\alpha_i$. That is, as long as the datum pose of the standard workpiece is determined, the datum reading $H_{10}$~$H_{260}$ of each measurement point can also be determined, that is, the datum reading $H_{10}$~$H_{260}$ of each measurement point is a constant.

The specific measurement process of the non-contact workpiece size measuring method will be described in detail below by taking the first measurement point as an example.

First, the standard workpiece is obliquely placed on the frame 1 from top to bottom to rotate and move a pressing plate and press on the standard workpiece. At this time, an end of the standard workpiece is located on a support table, and a positioning pin is inserted into a positioning hole in the standard workpiece, so that the standard workpiece can be limited on the frame 1 by a pressing assembly 4. In the process of placing the standard workpiece, a turning plate assembly 5 is in a shielding state, so as to shield the four detection sensors 31 arranged around the turning plate assembly 5. At the same time, a pushing and sweeping assembly 6 is in a retracted state, so as to shield the four detection sensors 31 arranged around the pushing and sweeping assembly 6. In addition, a code scanner 8 is started to scan information of the standard workpiece. At this time, the standard workpiece is arranged on the frame 1 in the datum pose.

Then, the turning plate assembly 5 is in an open state, and the four detection sensors 31 arranged around the turning plate assembly 5 are no longer shielded. At the same time, the pushing and sweeping assembly 6 is in an extended state, and the four detection sensors 31 arranged around the pushing and sweeping assembly 6 are no longer shielded, so that the above eight shielded detection sensors 31 can all perform normal detection work.

Then, a fourth driving piece 211 drives a third shielding plate 213 to rotate, so that the third shielding plate 213 rotates to no longer shield a light source 212 and a camera body, a light source 212 can provide light for the camera body during photographing. At this time, the light source 212 and the camera body can be exposed outside for photographing. At the same time, purge gas in an air pipe can purge water droplets on the standard workpiece, which is beneficial to photographing of the camera 21. Therefore, the two cameras 21 and the three datum sensors 22 can photograph and detect the standard workpiece, so as to respectively obtain the readings of the three datum sensors 22: 103.6785, 105.0149, and 114.0981. At the same time, the readings of the two cameras 21 on XY axes can be respectively: −766.5834/6.4381 and −219.5598/11.0778. Then, the above readings are respectively analyzed and processed to obtain the datum pose information $X_1$, $Y_1$, $Z_1$, $R_{x1}$, $R_{y1}$, and $R_{z1}$ of the standard workpiece. Analysis and processing of each above reading is a common reading processing manner in the related art, and the specific reading processing process will not be elaborated herein.

Then, the detection workpiece is used to directly and respectively measure compensated surface difference data $\alpha_1$−$\alpha_{26}$ at the twenty-six measurement points on the standard workpiece, at this time, the standard workpiece is in the datum pose. The compensated surface difference data $\alpha_1$ at the first measurement point is equal to 0.32, at this time, the first detection sensor 31 at the first measurement point detects that a distance $h_1$ therefrom to the first measurement point on the standard workpiece is equal to 93.2128. Then, according to the formula $H_{i0}=h_i+\alpha_i$, the calculation module calculates the datum reading $H_{10}$ at the first measurement point to be 93.2128+0.32=93.5328.

Then, the workpiece is placed on the frame 1 by using the above placement step, so that the workpiece is limited on the frame 1 in the measurement pose. The two cameras 21 and the three datum sensors 22 are used to photograph and detect the workpiece, so as to respectively obtain the readings of the three datum sensors 22: 103.5497, 104.7200, and 114.2996. At the same time, the readings of the two cameras 21 on the XY axes are respectively: −764.9585/4.8511 and −220.7755/13.0837. Then, the above readings are analyzed and processed to obtain the measurement pose information $X_2$, $Y_2$, $Z_2$, $R_{x2}$, $R_{y2}$, and $R_{z2}$ of the workpiece. At this time, the detection sensor 31 at the first measurement point detects that a distance $H_i$ therefrom to the first measurement point is equal to 92.9840.

Then, the calculation module respectively makes a difference between the datum pose information and the measurement pose information, that is, variations of the three datum sensors 22 are: 103.6785−103.5497=0.1288, 105.0149−104.7200=0.2949, and 114.0981−114.2996=−0.2015. The variations of the two cameras 21 on the X axis are respectively: −766.5834−(−764.9585)=−1.6249 and −219.5598−(−220.7755)=1.2157. The variations of the two cameras 21 on the Y axis are respectively: 6.4381−4.8511=−1.587 and 11.0778−13.0837=−2.0059. Then, the above readings are analyzed and processed to obtain changed pose information, which includes ΔX, ΔY, ΔZ, $\Delta R_x$, $\Delta R_y$, $\Delta R_z$.

Then, according to the following calculation formula:

$$(\Delta X, \Delta Y, \Delta Z, \Delta R_x, \Delta R_y, \Delta R_z)\begin{bmatrix} k_{i11} & \dots & k_{i16} \\ \vdots & \dots & \vdots \\ k_{i61} & \dots & k_{i66} \end{bmatrix} = (X_1, Y_1, Z_1 + h_{0i}, R_{x1}, R_{y1}, R_{z1}),$$

the calculation module calculates a pose offset variation $h_{01}$ of the detection sensor 31 at the first measurement point, and through the calculation of the above calculation formula, $h_{01}$=0.1657.

Finally, according to the following calculation formula:

$$\mu_i = H_{i0} - H_i - h_{0i},$$

the calculation module calculates calculated surface difference data $\mu_1$ at the first measurement point to be 93.5328−92.9840−0.1657=0.3831. Therefore, the calculated surface difference data $\mu_1$~$\mu_{26}$ at the twenty-six measurement points can be calculated. When $\mu_1$~$\mu_{26}$ all are located within $-2$ mm≤$\mu_1$~$\mu_{26}$≤2 mm, the external dimension of the workpiece is qualified. The units of the above angles are all degrees, and the units of surface difference data and offset are all mm.

Then, the new workpiece to be measured is placed on the frame 1 again in the measurement pose limit, and the above calculation steps are repeated, so that the calculated surface difference data of each measurement point on the new workpiece to be measured can be calculated, and it is determined whether the external dimension of the workpiece is qualified until the detection and calculation of the calculated surface difference data of all the workpieces to be measured are completed.

The above contents are only preferred embodiments of the present disclosure. For those of ordinary skill in the art, according to the concept of the present disclosure, there will be changes in the specific implementation modes and the application scope. The contents of the present description should not be construed as limiting the present disclosure.

INDUSTRIAL APPLICABILITY

The present disclosure provides a non-contact workpiece dimension measuring device and method. The measuring device includes: a frame, on which a workpiece having a measurement pose is arranged; a first detection assembly, arranged on the frame and aligned with a first feature point of the workpiece, so as to obtain measurement pose information of the workpiece in a non-contact manner; a second detection assembly, including a plurality of detection sensors arranged on the frame in a distributed manner, one detection sensor being aligned with one measurement point, and the detection sensor being configured to detect a distance therefrom to the measurement point on the workpiece; and a calculation module, configured to calculate a pose offset variation of the detection sensor at the measurement point according to datum pose information and the measurement pose information, so that the calculation module can calculate calculated surface difference data of the measurement point according to the pose offset variation, the detection distance of the detection sensor, and a datum reading of the measurement point. The measuring device of the present disclosure can measure the external dimension of the workpiece in a non-contact manner.

In addition, it is to be understood that the non-contact workpiece dimension measuring device and method disclosed herein are reproducible and may be used in a variety of industrial applications. For example, the non-contact workpiece dimension measuring device and method disclosed herein may be used in the technical field of workpiece dimension measurement.

What is claimed is:

1. A non-contact workpiece dimension measuring device for detecting and calculating calculated surface difference data of a workpiece, wherein the non-contact workpiece dimension measuring device comprises:

a frame, on which the workpiece having a measurement pose is arranged, wherein a plurality of first feature points and a plurality of measurement points are arranged on the workpiece;

a first detection assembly, arranged on the frame and aligned with the first feature point, wherein the first detection assembly can obtain a measurement pose information of the workpiece in the measurement pose in a non-contact manner;

a second detection assembly, comprising a plurality of detection sensors, wherein the plurality of detection sensors are arranged on the frame in a distributed manner, one of the plurality of detection sensors is aligned with one of the plurality of measurement points, and the detection sensor is configured to detect a distance from the detection sensor to the measurement point on the workpiece; and a calculation module, configured to calculate a pose offset variation of the detection sensor at the measurement point according to a datum pose information and the measurement pose information, so that the calculation module can calculate the calculated surface difference data of the measurement point according to the pose offset variation, a detection distance from the detection sensor to the measurement point on the workpiece, and a datum reading of the measurement point, wherein the datum pose information and the datum reading are both constants.

2. The non-contact workpiece dimension measuring device according to claim 1, wherein a standard workpiece is arranged on the frame before the workpiece is arranged; a structure of the standard workpiece is the same as a structure of the workpiece, and a manufacturing accuracy of the standard workpiece is higher than a manufacturing accuracy of the workpiece; the standard workpiece has a datum pose; a plurality of second feature points are arranged on the standard workpiece; the first detection assembly can also be aligned with the second feature point, so that the first detection assembly can also obtain the datum pose information of the standard workpiece in the datum pose in a non-contact manner.

3. The non-contact workpiece dimension measuring device according to claim 2, wherein a plurality of measurement points are arranged on the standard workpiece, the measurement points on the standard workpiece are arranged in one-to-one correspondence with the measurement points on the workpiece, and the detection sensor is further configured to detect a distance from the detection sensor to the measurement point on the standard workpiece; the non-contact workpiece dimension measuring device further comprises:

a detection workpiece, configured to detect compensated surface difference data of each measurement point when the standard workpiece is in the datum pose, wherein the datum reading is equal to a sum of the detection distance from the detection sensor to the measurement point on the standard workpiece and the compensated surface difference data.

4. The non-contact workpiece dimension measuring device according to claim 2, wherein the first detection assembly comprises:

at least two cameras, wherein one of the at least two cameras is aligned with one first feature point or one second feature point for photographing, so as to obtain an offset of the workpiece or the standard workpiece on an X axis, an offset on a Y axis, and a deflection angle around a Z axis; and at least three datum sensors, wherein one of the at least three datum sensors is aligned with one first feature point or one second feature point for detection, so as to obtain an offset of the workpiece or the standard workpiece on the Z axis, a deflection angle around the X axis, and a deflection angle around the Y axis.

5. The non-contact workpiece dimension measuring device according to claim 4, wherein, in two adjacent detections, a difference between readings of any datum sensor is $A_1$, a difference between readings of one detection sensor arranged close to the any datum sensor is $A_2$, and an absolute value of a difference of $A_1-A_2$ is within a first threshold range.

6. The non-contact workpiece dimension measuring device according to claim 4, further comprising four pressing assemblies, wherein the four pressing assemblies are arranged on the frame in a square shape, and the cameras are located inside the four pressing assemblies; the pressing assembly comprises:

a support table, arranged on the frame;

a pressing plate and a first driving piece, wherein the first driving piece is in driving connection with the pressing plate to drive the pressing plate to rotate, move and press the workpiece, and the support table supports the workpiece; and a positioning pin, arranged on the frame and configured to be inserted into a positioning hole in the workpiece.

7. The non-contact workpiece dimension measuring device according to claim 4, further comprising: baffles, wherein the baffles are arranged on two opposite sides of one end of the frame on the Y axis, and the baffles are configured to resist the workpiece when the workpiece is obliquely placed on the frame from top to bottom.

8. The non-contact workpiece dimension measuring device according to claim 7, further comprising: turning plate assemblies, wherein the turning plate assemblies are arranged on two opposite sides of one end of the frame on the Y axis, and the turning plate assemblies are arranged opposite to the baffles.

9. The non-contact workpiece dimension measuring device according to claim 8, further comprising: pushing and sweeping assemblies, wherein the pushing and sweeping assemblies are arranged on two opposite sides of the other end of the frame on the Y axis, the pushing and sweeping assemblies, arranged outside the baffles, and the baffles are located on a same side of the frame, and the pushing and sweeping assemblies and the turning plate assemblies are oppositely arranged on the frame.

10. A non-contact workpiece dimension measuring method based on the non-contact workpiece dimension measuring device according to claim 3, comprising:

S1, obtaining a datum pose information, wherein the datum pose information comprises an offset $X_1$ on an X axis, an offset $Y_1$ on a Y axis, an offset $Z_1$ on a Z axis, a deflection angle $R_{x1}$ around the X axis, a deflection angle $R_{y1}$ around the Y axis, and a deflection angle $R_{z1}$ around the Z axis of a standard workpiece when the standard workpiece is in a datum pose;

S2, placing a workpiece on a frame in a measurement pose, so that a first detection assembly obtains a measurement pose information of the workpiece, wherein the measurement pose information comprises an offset $X_2$ on the X axis, an offset $Y_2$ on the Y axis, an offset $Z_2$ on the Z axis, a deflection angle $R_{x2}$ around the X axis, a deflection angle $R_{y2}$ around the Y axis, and a deflection angle $R_{z2}$ around the Z axis of the workpiece; and at the same time, when the workpiece is in the measurement pose, obtaining a reading $H_i$ of each detection sensor;

S3, subtracting, by a calculation module, the datum pose information from a corresponding measurement pose information to obtain a changed pose information, wherein the changed pose information comprises a variation $\Delta X$ on the X axis, a variation $\Delta Y$ on the Y axis, a variation $\Delta Z$ on the Z axis, a variation angle $\Delta R_x$ around the X axis, a variation angle $\Delta R_y$ around the Y axis, and a variation angle $\Delta R_z$ around the Z axis;

S4, according to the following calculation formula:

$$(\Delta X, \Delta Y, \Delta Z, \Delta R_x, \Delta R_y, \Delta R_z)\begin{bmatrix} k_{i11} & \dots & k_{i16} \\ \vdots & \dots & \vdots \\ k_{i61} & \dots & k_{i66} \end{bmatrix} = (X_1, Y_1, Z_1 + h_{0i}, R_{x1}, R_{y1}, R_{z1}),$$

calculating, by the calculation module, a pose offset variation $h_{0i}$ of the detection sensor at each measurement point, wherein i is a position sequence number of the measurement point, $k_{i00}-k_{i66}$ at the same measurement point are fixed values, and $k_{i11}-k_{i66}$ at different measurement points are different; and

S5, according to the following calculation formula:

$$\mu_i = H_{i0} - H_i - h_{0i},$$

calculating, by the calculation module, calculated surface difference data $\mu_i$ of each measurement point, and when the calculated surface difference data $\mu_i$ of all the measurement points are within a preset range, determining that an external dimension of the workpiece is qualified, wherein $H_{i0}$ is a datum reading of the measurement point.

11. The non-contact workpiece dimension measuring method according to claim 10, further comprising the following steps between the S1 and the S2:

S11, obtaining a detection distance $h_i$ from the detection sensor to the measurement point on the standard workpiece;

S12, measuring compensated surface difference data $\alpha_i$ of the measurement point on the standard workpiece by using a detection workpiece; and

S13, according to the following calculation formula:

$$H_{i0} = h_i + \alpha_i,$$

calculating, by the calculation module, the datum reading of each measurement point.

12. The non-contact workpiece dimension measuring method according to claim 11, wherein, at a same measurement point, an absolute value of a difference between the calculated surface difference data $\mu_i$ of the workpiece and the compensated surface difference data $\alpha_i$ of the standard workpiece is within a second threshold range.

13. The non-contact workpiece dimension measuring method according to claim 10, wherein, in S1, the standard workpiece is placed on the frame in the datum pose, so that the first detection assembly obtains the datum pose information of the standard workpiece.

* * * * *